United States Patent
Dobrovolsky et al.

(10) Patent No.: US 11,354,592 B2
(45) Date of Patent: Jun. 7, 2022

(54) INTELLIGENT COMPUTATION ACCELERATION TRANSFORM UTILITY

(71) Applicant: MORGAN STANLEY SERVICES GROUP INC., New York, NY (US)

(72) Inventors: Michael A. Dobrovolsky, New York, NY (US); Kwokhin Chu, London (GB); Pankaj Parashar, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 839 days.

(21) Appl. No.: 16/227,161

(22) Filed: Dec. 20, 2018

(65) Prior Publication Data

US 2020/0202251 A1    Jun. 25, 2020

(51) Int. Cl.
| | |
|---|---|
| *G06N 20/00* | (2019.01) |
| *G06F 8/76* | (2018.01) |
| *G06F 8/71* | (2018.01) |
| *G06F 8/40* | (2018.01) |
| *G06F 9/48* | (2006.01) |

(52) U.S. Cl.
CPC ............. *G06N 20/00* (2019.01); *G06F 8/40* (2013.01); *G06F 8/71* (2013.01); *G06F 8/76* (2013.01); *G06F 9/48* (2013.01)

(58) Field of Classification Search
CPC .. G06N 20/00; G06F 8/40; G06F 8/71; G06F 8/76; G06F 9/48
See application file for complete search history.

(56) References Cited

U.S. PATENT DOCUMENTS

| | | | |
|---|---|---|---|
| 9,715,663 B2* | 7/2017 | Baldini Soares | G06N 20/00 |
| 2010/0088490 A1* | 4/2010 | Chakradhar | G06N 3/063 |
| | | | 712/34 |
| 2017/0132163 A1* | 5/2017 | Aslot | G06F 12/08 |
| 2019/0121674 A1* | 4/2019 | Chen | G06F 9/5033 |
| 2020/0125926 A1* | 4/2020 | Choudhury | G06N 3/082 |
| 2020/0167137 A1* | 5/2020 | Geleji | G06F 8/60 |

OTHER PUBLICATIONS

Mitesh R. Meswani, "Modeling and predicting performance of high performance computing applications on hardware accelerators", Dec. 28, 2012, The International Journal of High Performance Computing Applications 27(2) 89-108 (Year: 2012).*

* cited by examiner

*Primary Examiner* — Wei Y Zhen
*Assistant Examiner* — Amir Soltanzadeh
(74) *Attorney, Agent, or Firm* — Weitzman Law Offices, LLC (57) ABSTRACT

Systems and methods for intelligent computation acceleration transform to allow applications to be executed by accelerated processing units such as graphic processing units (GPUs) or field programmable gate arrays (FPGAs) are disclosed. In an embodiment, a computational profile is generated for an application based on execution metrics of the application for the CPU and the accelerated processing unit, and a genetic algorithm (GA) prediction model is applied to predict execution speedup on an accelerated processing unit for the application. In an embodiment, upon identification of speedup, computational steps are arbitrated among various processing units according to compute availability to achieve optimal completion time for the compute job.

18 Claims, 4 Drawing Sheets

INTELLIGENT COMPUTATION ACCELERATION TRANSFORM UTILITY

FIELD OF THE INVENTION

The present invention relates generally to intelligently transforming applications from classical computational environments utilizing central processing units (CPUs) to accelerated computational environments utilizing accelerated processing units, such as graphic processing units (GPUs) or field programmable gate arrays (FPGAs).

BACKGROUND

Various applications have been created based on the assumption that algorithms for such applications were to be processed in classical computational environments, that is, to be executed on conventional CPUs. In some types of applications, for example, time-sensitive financial transactions such as equity market transactions, there may be stringent limits on the amount of time lag or latency for a given transaction. GPUs and FPGAs are known to have relatively fast processing speeds and capable of handling large computational loads. At least in some instances, GPUs or FPGAs may be better suited for executing time-sensitive algorithms because of their abilities to process large amounts of computations with short latencies. Various attempts have been made to adapt algorithms developed for conventional CPUs to run on GPUs or FPGAs. Due to the different processor architectures, however, it was often necessary to modify the algorithm itself before it can be executed by a GPU or FPGA.

Accordingly, there is a need for an improved system and method for transforming applications that were developed for classical computational environments utilizing CPUs to accelerated computational environments utilizing GPUs or FPGAs.

SUMMARY

Systems and methods for transforming applications for execution by accelerated processors such as GPUs or FPGAs are disclosed.

According to an embodiment, a computer-implemented system comprises: a central processing unit (CPU); an accelerated processing unit; and a processor configured to: receive a plurality of applications; generate a computational profile for each of the applications based at least in part upon execution metrics of each of the applications for the CPU and the accelerated processing unit; and apply a genetic algorithm (GA) prediction model to predict n if an execution speedup is achievable on an accelerated processing unit for each of the applications based at least in part upon: the computational profile for each of the applications; the computational profile for each of the benchmarks; and available computational capacities of the CPU and the accelerated processing unit within an execution time window; wherein the accelerated processing unit is configured to process an accelerated code version of a first one of the applications in response to a prediction, by the processor, that: the accelerated processor unit has a sufficient available computational capacity to execute the accelerated code version of the first application within the execution time window; and a predicted accelerated processing unit execution speed is faster than a predicted or observed CPU execution speed within the execution time window.

According to another embodiment, a computer-implemented method comprises: receiving, by a processor, a plurality of applications, wherein each of the applications is to be executed by a central processing unit (CPU) or an accelerated processing unit; generating, by the processor, a computational profile for each of the applications based at least in part upon execution metrics of each of the applications for the CPU and the accelerated processing unit; and applying, by the processor, a genetic algorithm (GA) prediction model to predict if an execution speedup is achievable on an accelerated processing unit for each of the applications based at least in part upon: the computational profile for each of the applications; the computational profile for each of the benchmarks; and available computational capacities of the CPU and the accelerated processing unit within an execution time window; wherein the accelerated processing unit is configured to process an accelerated code version of a first one of the applications in response to a prediction, by the processor, that: the accelerated processor unit has a sufficient available computational capacity to execute the accelerated code version of the first application within the execution time window; and an predicted accelerated processing unit execution speed is faster than an observed or predicted CPU execution speed within the execution time window.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

Figure 1:
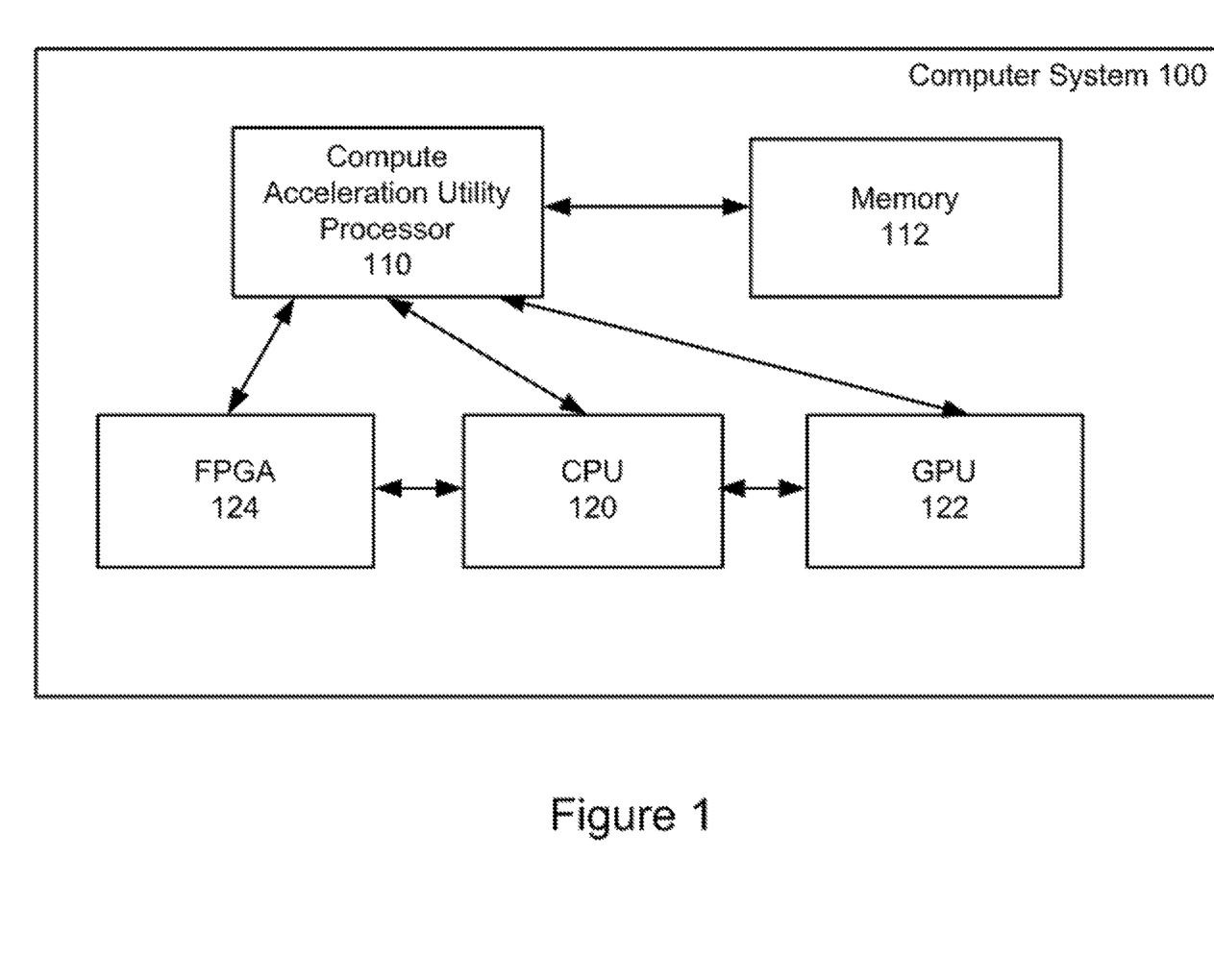
FIG. 1 illustrates an example of a block diagram of a computer system according to an exemplary embodiment of the invention.

An embodiment of a computer system 100 is shown in FIG. 1. The computer system 100 includes a compute acceleration utility processor 110, a memory 112, a CPU 120, a GPU 122 and an FPGA 124. The compute acceleration utility processor 110 is configured to determine whether an application is to be executed by the CPU 120, the GPU 122, or the FPGA 124 based at least in part upon execution metrics and available computational capacities of the various types of processors, detailed examples of which will be described below.

In the embodiment shown in FIG. 1, the compute acceleration utility processor 110, the CPU 120, the GPU 122 and the FPGA 124 are part of the computer system 100, although in other embodiments, these components may be implemented in computers at separate locations within a network. An example of a computer network which includes multiple computers with CPU, GPU and FPGA processors will be described below with reference to FIG. 2.

Referring to the embodiment shown in FIG. 1, the compute acceleration utility processor 110 may be coupled to the memory 112, the CPU 120, the GPU 122 and the FPGA 124. In an embodiment, the compute acceleration utility processor itself may be a CPU, a GPU or an FPGA. In another embodiment, the compute acceleration utility may be running on the CPU 120, the GPU 122 or the FPGA 124. In an embodiment, the CPU 120, the GPU 122 and the FPGA 124 may be coupled to one another for parallel or hybrid processing. The computer system 100 may also include a database which may include an associated database server and a storage medium.

Figure 2:
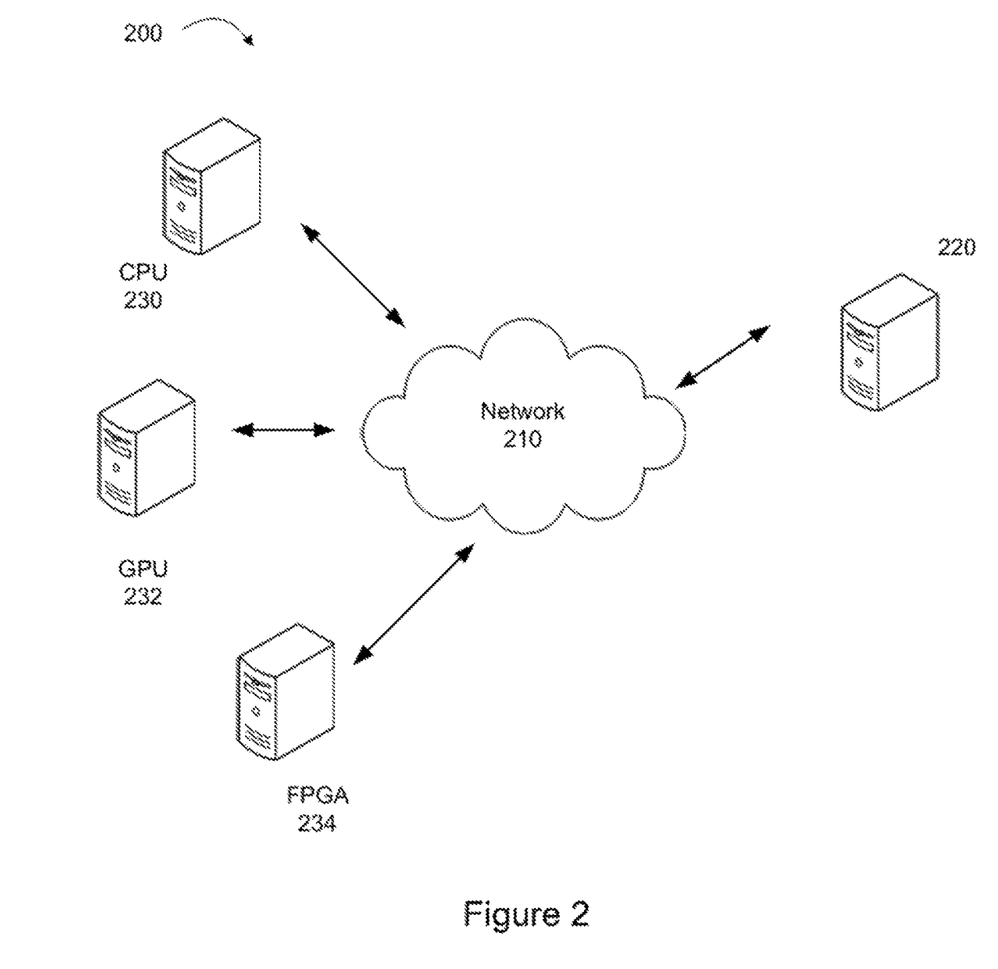
FIG. 2 illustrates an example of a block diagram of a computer network according to an exemplary embodiment of the invention.

An embodiment of a computer network 200 is shown in FIG. 2. The computer network 200 includes a computer 220 which has a compute acceleration utility processor for determining whether an application is to be executed by a CPU, a GPU or an FPGA, or to be executed by a hybrid of CPU, GPU and/or FPGA. The computer network 200 as shown in FIG. 2 also includes a CPU computer 230, a GPU computer 232, and a FPGA computer 234 which are capable of communicating with one another via a network 210. One more or more additional CPU, GPU and/or FPGA computers may be provided in the computer network 200. The network 210 may comprise any one or more of the Internet, an intranet, a Local Area Network (LAN), a Wide Area Network (WAN), an Ethernet connection, a WiFi network, a cellular phone network such as 2G, 3G, 4G or 5G network, a Bluetooth network, a Global Positioning System (GPS) link, a satellite communications network, a data bus, or other network, for example.

Figure 3:
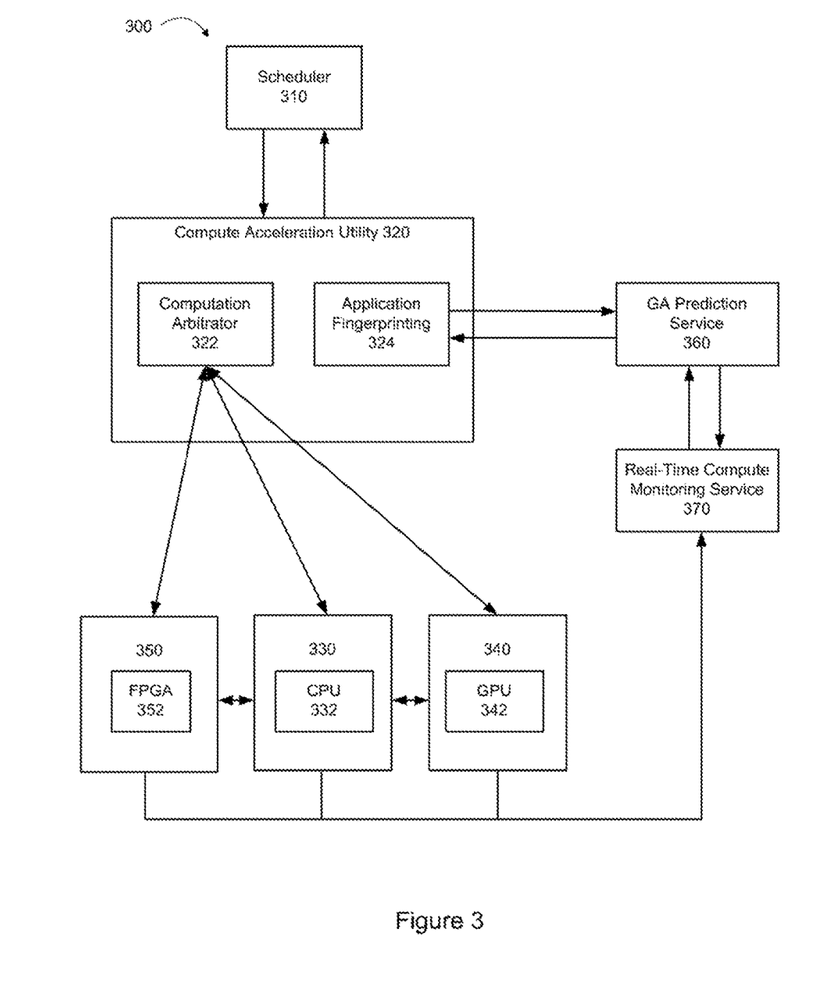
FIG. 3 illustrates an example of a block diagram of computational components for intelligent computation acceleration transform according to an exemplary embodiment of the invention.

FIG. 3 illustrates an example of a block diagram of computational components in a system 300 for intelligent computation acceleration transform according to an embodiment of the invention. In the embodiment shown in FIG. 3, the system 300 includes a scheduler 310 which schedules applications to be executed by the system 300. In an embodiment, the scheduler 310 communicates with a compute acceleration utility 320. In an embodiment, the compute acceleration utility 320 receives the applications from the scheduler 310 in a queue. Each of the applications may have a different priority for execution, and the execution priority of each application may or may not correspond to the position of such application in the queue. In other words, the execution priority of each application may or may not correspond to the time at which such application is received by the compute acceleration utility 320.

In the embodiment shown in FIG. 3, the compute acceleration utility 320 includes a computation arbitrator 322 and an application fingerprinting module 324. In an embodiment, the application fingerprinting module 324 may store an application computational profile based on collected information regarding computational characteristics within the registers of the CPU, GPU and/or FPGA. In an embodiment, the computational profile of an application may be created based on application computational fingerprinting metrics.

In an embodiment, the application computational fingerprinting metrics may be generated and stored in the form of matrices. In an embodiment, application computational fingerprinting metrics may be an intersection between arrays of data sourced from applications under decision reviews and the number of dimensions that are collected based on historical computational fingerprints. In an embodiment, the decision reviews may be based on prior decisions as to whether such applications were optimally executed on CPUs, GPUs, FPGAs, or hybrids of CPUs, GPUs, and/or FPGAs.

In an embodiment, the computation arbitrator 322 in the compute acceleration utility 320 may include an algorithmic broker that negotiates the computational inputs and outputs across various computation paths based on predicted optimization rules. The predicted optimization rules may be based on historical information regarding optimal execution paths of such applications through CPUs, GPUs, FPGAs, or hybrids of CPUs, GPUs and/or FPGAs.

In the embodiment shown in FIG. 3, the system 300 also includes a genetic algorithm (GA) prediction service 360 which utilizes a GA prediction model to predict whether an accelerated code version, such as a GPU version or a FPGA version, of a given application will increase the speed of execution, or an alternative version of the application on an alternative computational path will do so. In an embodiment, for a given compute of an application, a computational fingerprint that includes various processing parameters across various types of computes may be used to predict whether the speed of execution may be increased by executing an accelerated code version, such as a GPU version or an FPGA version of the application, over the CPU version of the application. In an embodiment, predicted increases in execution speeds of various versions of the application may be used to define an optimal computational path to minimize the run time of the application.

As an illustrative example of a GA prediction model to predict gains in execution speeds by executing a GPU version, an FPGA version, or an alternative version, such as a hybrid version, of an application with an acceptably high degree of accuracy is described as follows. For example, an application may be characterized by a multi-dimensional parameter A in M dimensions as follows:

$$A=(a_1, a_2, a_3, \ldots, a_M)$$

where $a_1, a_2, a_3, \ldots, a_M$ may be regarded as a coordinate in an M-dimensional space where each computational fingerprinting attribute of the application constitutes one of the dimensions. In an embodiment, this multi-dimensional parameter A may be representative of a computational profile of the application based on the application computational fingerprinting metrics.

In an embodiment, the GA prediction model may use a plurality of benchmarks, which may be represented by a multi-dimensional benchmark B in M dimensions as follows:

$$B=(b_1, b_2, b_3, \ldots, b_M)$$

where $b_1, b_2, b_3, \ldots, b_M$ each represents an individual benchmark in an experimental setup. In an embodiment, each of the benchmarks $b_1, b_2, b_3, \ldots, b_M$ may be represented as a coordinate in an M-dimensional space.

In an embodiment, a measure of how close the multi-dimensional parameter A of an application is to the multi-dimensional benchmark B may be determined by a normalized Euclidean distance d in the M-dimensional space as follows:

$$d=\sqrt{(a_1-b_1)^2+(a_2-b_2)^2+\ldots+(a_M-b_M)^2}$$

A small Euclidean distance d may indicate that the computational fingerprinting attributes or parameters of an application are close to the benchmarks. Conversely, a large Euclidean distance d may indicate that the computational fingerprinting attributes or parameters of an application are far apart from the benchmarks.

As an illustrative example, a prediction with an accuracy of about 88.6% may be obtained on 87 dimensional benchmark space in an experimental setup. In an 87-dimensional space, parameter A for an application is given as follows:

$$A=(a_1,a_2,a_3,\ldots,a_{87})$$

Benchmark B used by the GA prediction model in an 87-dimensional space is given as follows:

$$B=(b_1,b_2,b_3,\ldots,b_{87})$$

The Euclidean distance d between A and B in this 87-dimensional space is given as follows:

$$d=\sqrt{(a_1-b_1)^2+(a_2-b_2)^2+\ldots+(a_{87}-b_{87})^2}$$

In an embodiment, in order to predict whether an accelerated code version of a given application will speed up the execution process for a given compute, weighted harmonic average speedups of N nearest Benchmark neighbors of that compute A may be calculated and used as an estimated speedup for A. For example, if the estimated speedup for A is equal to or greater than 1, then a prediction may be made that the accelerated code version will run faster than CPU code version.

In an embodiment, an application source code parser may be provided as an extension of the genetic algorithm in the GA prediction model to discover process steps in the application source code that may be suitable for parallelization. In an embodiment, the application source code parser may identify various steps in the application source code that have a potential for speedup in accelerated computational environments such as those utilizing GPUs or FPGAs. In an embodiment, the application source code parser may use a CPU profiler application to identify sections of the code that contributes to a significant portion of the whole application execution time, insert compiler directives around the sections of code, and compile the modified source code using acceleration compiler to verify modified application obtains execution speedup.

In the embodiment shown in FIG. 3, the compute acceleration utility 320 may identify all applications in the queue from the scheduler 310 and the computational fingerprints for those applications. In an embodiment, the compute acceleration utility 320 may identify the applications and their associated computational fingerprints by querying the metadata for those applications and retrieving their computational profiles. In an embodiment, the computation arbitrator 322 in the compute acceleration utility 320 may be configured as an algorithmic broker which may choose computational paths for applications based on selected optimization rules.

In an embodiment, to enable applications to be run in multiple or mixed computational environments, a candidate application may be provided with multiple templated source code versions. For example, for a given application, a first templated source code version for execution in a CPU-based computational environment, a second templated source code version for execution in a GPU-based computational environment, a third templated source code version for execution in an FPGA-based computational environment, and/or a fourth templated source code version for execution in a mixed or hybrid computational environment that includes one or more CPUs, one or more GPUs, and/or one or more FPGAs may be provided.

In an embodiment, the applications may also have their computational fingerprints identified during performance evaluation and stored in a metadata repository. In an embodiment, each application may have a switch flag controlled by the algorithmic broker at run time or ahead of the start of execution. In an embodiment, a given source code may be translated or transformed into a templated source code version, such as a CPU source code version, a GPU source code version, an FPGA source code version, or a hybrid source code version. In an embodiment, the source code translation or transformation may be provided by an application source code parser as a GA extension to the GA prediction model in the GA prediction service 360. In an embodiment, once the compute acceleration utility 320 identifies the computational fingerprints for a given application, it may request the GA prediction service 360 encapsulating the underlying GA machine learning (ML) ensemble to generate a predicted application speedup and an optimization path for the speedup, which may run through a CPU, GPU, FPGA or hybrid computational environment. In an embodiment, a prediction service is a remote or a local service that encapsulates the GA ML ensemble and respective prediction methods and that exposes rest endpoints to a consumer process. In this case, the consumer process may be a sub-process within the compute acceleration utility.

In the embodiment shown in FIG. 3, the system 300 includes three computers 330, 340 and 350 which include CPU 332, GPU 342 and FPGA 352, respectively. Although each of the computers 330, 340 and 350 is shown as a single block in FIG. 3, each computer may include a cluster of processing units. For example, the computer 330 may include a cluster of multiple CPUs, the computer 340 may include a cluster of multiple GPUs, and the computer 350 may include a cluster of FPGAs.

In an embodiment, the computation arbitrator 322, upon determining which computational path would be an optimal path for executing a given application, may communicate with one of the computers 330, 340 and 350 and instructs that computer to execute the corresponding source code version for that application. For example, if the compute acceleration utility 320 determines that the optimal computational path is through a CPU, then a CPU source code version is provided to the computer 330. If the compute acceleration utility 320 determines that the optimal computational path is through a GPU, then a GPU source code version is provided to the computer 340. Likewise, if the compute acceleration utility 320 determines that the optimal computational path is through an FPGA, then an FPGA source code version is provided to the computer 350. Alternatively, if the compute acceleration utility 320 determines that the optimal computational path would be through hybrid processing, then a hybrid code version may be provided to two or more of the computers 330, 340 and 350 for hybrid processing of the application.

In an embodiment, the GA prediction service 360 may query a real-time compute monitoring service 370, which is coupled to the computers 330, 340 and 350 to monitor the actual performance of these computers in real time. In an embodiment, the GA prediction service 360 may retrieve information regarding the compute availability and utilization of the computers 330, 340 and 350 from the real-time compute monitoring service 370 and estimate the availability of all computational resources at the platform level at any given time for application execution.

In an embodiment, based on the retrieved information regarding the compute availability or utilization of the computers 330, 340 and 350 at the platform level, the GA prediction service 360 may estimate actual improved execution speeds on GPU, FPGA or alternative computational paths. In an embodiment in which multiple applications are provided by the scheduler 310 in a queue, the GA prediction service 360 may compute the estimates of improved execution speeds on GPU, FPGA or alternative computational paths for each application in the queue.

In an embodiment, at least some of the applications must be executed within a certain time frame or execution time window. In some instances, the execution time window for a given application may be elastic and can be dynamically changed. For example, if an application is scheduled to start running at 3:00 am EST, but by that time at least 50% of all CPU, GPU and FPGA processing resources are not present, then the execution time of that application may be dynamically changed or moved to a more compute-favorable time slot. In some instances, an application must be executed within a given execution time window. In an embodiment, the compute acceleration utility 320 may find an optimal start time for executing that application within the execution time window, based on the estimated compute availability of the computers 330, 340 and 350 provided by the GA prediction service 360.

In an embodiment, the ability to change application execution time may be programmatically automated, for example, based on business rules via implicit or explicit logic. Alternatively, the application execution time may be manually adjusted by a human operator. As another alternative, the compute acceleration utility 320 may suggest an optimal application time to the operator and allow the operator to adjust the application execution time manually.

In an embodiment, the computation arbitrator 322 may be configured to determine the amount of potential computational speedup for a given application by taking into account one or more factors, including, for example, the available computational resources at the time of execution for CPU, GPU, and/or FPGA, and the costs of executing the application by the CPU, GPU and/or FPGA at the execution time. In some instances, some applications must be executed within a given execution time window, for example, from 1:00 am EST to 4:00 am EST, and such an execution time window may be specified by application computation configuration rules. In an embodiment, the computation acceleration utility 320 may perform the tasks described above based on the application computation configuration rules and conditional constraints, such as the available capacities of CPU, GPU and/or FPGA computing resources, and the costs of the computing resources for executing the application.

In an embodiment, the computation arbitrator 322 may be configured to perform these determinations for any intervals within the application execution time window, for example, 10-minute intervals, 30-minute intervals, or 1-hour intervals. For example, if the execution time window for a given application is between 1:00 am EST and 4:00 am EST, the computation arbitrator may perform three set of calculations for the 1-hour interval setting.

In an embodiment, once all the incoming applications are processed and computations of estimated optimal execution paths based on estimated speedups and available capacities of CPU, GPU and/or FPGA computing resources are completed, the decision for the actual execution path may be made in a manual or automated mode based on broker configuration settings, which may be programmed into the computation arbitrator 322. In an automated mode, the computation arbitrator 322 may select the CPU computer 330, the GPU computer 340, the FPGA computer 350, or a hybrid of these computers, to process a corresponding code version of the application based on predetermined configuration settings, which may include hard or soft decision making based on factors such as cost optimization, expected increases in execution speeds, and optimal execution times.

In a manual mode, the computation arbitrator 322 may perform the same analyses described above for the automated mode, recommend an execution path to an operator, and allow the operator to make the final decision on the actual execution path. In either automated or manual mode, the compute acceleration utility 320 may generate an estimated optimal execution path for each application via CPU, GPU, FPGA, or a hybrid of CPU, GPU and/or FPGA. Although accelerated computing environments have been described with respect to GPUs and FPGAs, other types of accelerated computing environments may also be utilized within the scope of the disclosure.

Figure 4:
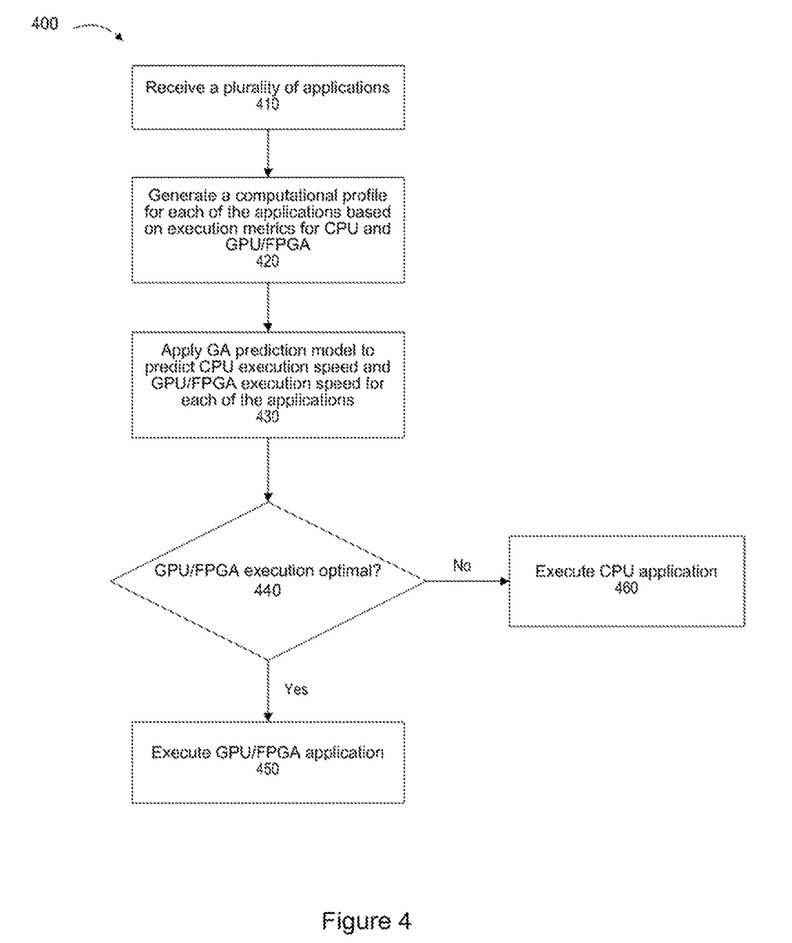
FIG. 4 illustrates an example of a process flow for intelligent computation acceleration transform according to an exemplary embodiment of the invention.

FIG. 4 illustrates an example of a process flow 400 for intelligent computation acceleration transform according to an embodiment. In the embodiment shown in FIG. 4, the compute acceleration utility receives a plurality of applications in a queue in step 410. The compute acceleration utility then generates a computational profile for each of the applications based on the execution metrics for the CPU and for an accelerated processing unit, such as a GPU or FPGA, in step 420. In an embodiment, the GA prediction service applies a genetic algorithm (GA) prediction model to predict the CPU execution speed and the execution speed for an accelerated processing unit, such as a GPU or FPGA, for each of the applications in step 430. The compute acceleration utility then determines whether accelerated execution of an application by GPU or FPGA is optimal, in step 440. If accelerated execution by GPU or FPGA is optimal, then a GPU or FPGA code version of the application is executed by the GPU or FPGA in step 450. Otherwise, a CPU code version of the application is executed by the CPU in step 460.

In an embodiment, the GA prediction model may predict a CPU execution speed and an accelerated processing unit (e.g., GPU or FPGA) execution speed based at least on the computational profile for each of the applications and the available computational capacities of the CPU and the accelerated processing unit (e.g., GPU or FPGA) within an execution time window, as described above with reference to FIG. 3. In an embodiment, the accelerated processing unit (e.g., GPU or FPGA) may be configured to process an accelerated code version (e.g., GPU or FPGA code version) of the application in response to a determination by the compute acceleration utility 320 that: (1) the accelerated processing unit (e.g., GPU or FPGA) has a sufficient available computational capacity to execute the accelerated code version (e.g., GPU or FPGA code version) of the application, and (2) the predicted accelerated processing unit (e.g., GPU or FPGA) speed is faster than the predicted CPU execution speed within the execution time window.

In an embodiment, the GA prediction service 360 may predict that the accelerated processing unit (e.g., GPU or FPGA) execution speed is not faster than the CPU execution speed for a given application within a given execution time window based at least on the computational profile for the application and the available computational capacities of the CPU and the accelerated processing unit (e.g., GPU or FPGA) within the execution time window. In this scenario, the CPU may process a CPU code version of the application in response to a determination by the compute acceleration utility 320 that: (1) the accelerated processing unit (e.g., GPU or FPGA) has an insufficient available computational capacity to execute the accelerated code version (e.g., GPU or FPGA code version) of the application, or (2) the predicted accelerated processing unit (e.g., GPU or FPGA) speed is not faster than the predicted CPU execution speed within the execution time window.

In an embodiment, the GA prediction model also may be applied to predict the execution speed of hybrid processing by the CPU and an accelerated processing unit (e.g., GPU or FPGA) for each application. In an embodiment, the compute acceleration utility 320 may be configured to generate an optimization path for processing by the CPU, accelerated processing by the GPU and/or FPGA, or hybrid processing by the CPU and the GPU and/or FPGA.

In an embodiment in which multiple applications are awaiting execution, the computation arbitrator 322 in the compute acceleration utility 320 may be configured to arbitrate the priorities of executing the applications based at least on: (1) predicted increases in computational speeds of the applications at an execution time within the execution time window based at least in part on the available computational capacities of the CPU and the accelerated processing unit (e.g., GPU or FPGA) at the execution time, or (2) costs of executing the applications by the CPU and by the accelerated processing unit at the execution time.

Those skilled in the art will appreciate that the diagrams discussed above are merely examples of a system for intelligent computation acceleration transform and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system, comprising:
a central processing unit (CPU);
an accelerated processing unit; and
a processor coupled to the CPU and the accelerated processing unit, the process configured to:
receive a plurality of applications;
generate a computational profile for each of the applications based at least in part upon execution metrics of each of the applications for the CPU and the accelerated processing unit; and
apply a genetic algorithm (GA) prediction model to predict if an execution speedup is achievable on an accelerated processing unit for each of the applications based at least in part upon:
the computational profile for each of the applications;
the computational profile for each of the benchmarks; and
available computational capacities of the CPU and the accelerated processing unit within an execution time window;
wherein the accelerated processing unit is configured to process an accelerated code version of a first one of the applications in response to a prediction, by the processor, that:
the accelerated processor unit has a sufficient available computational capacity to execute the accelerated code version of the first application within the execution time window; and
a predicted accelerated processing unit execution speed is faster than a predicted or observed CPU execution speed within the execution time window; and
wherein the CPU is configured to process a CPU version of a second one of the applications in response to a determination, by the processor, that:
the accelerated processor unit has an insufficient available computational capacity to execute an accelerated code version of the second application within the execution time window; or
the predicted accelerated processing unit execution speed is not faster than the observed or predicted CPU execution speed within the execution time window.

2. The computer-implemented system of claim 1, wherein the accelerated processing unit comprises a processing unit selected from the group consisting of a graphic processing unit (GPU) and a field programmable gate array (FPGA).

3. The computer-implemented system of claim 2, wherein the accelerated code version of the first application comprises an application selected from the group consisting of a GPU code version of the first application and an FPGA code version of the first application.

4. The computer-implemented system of claim 1, wherein the processor is further configured to arbitrate priorities of executing the first and second applications.

5. The computer-implemented system of claim 4, wherein the priorities of executing the first and second applications are arbitrated based at least in part upon:
predicted increases in computational speeds of the first and second applications at an execution time within the execution time window based at least in part upon available computational capacities of the CPU and the accelerated processing unit at the execution time; or
costs of computations of the first and second applications by the CPU and the accelerated processing unit at the execution time.

6. The computer-implemented system of claim 1, wherein the processor is further configured to apply the GA prediction model to predict a hybrid execution speed of hybrid processing by the CPU and the accelerated processing unit for each of the applications.

7. The computer-implemented system of claim 6, wherein the processor is further configured to generate an optimization path for processing by the CPU, processing by the accelerated processing unit, or hybrid processing by the CPU and the accelerated processing unit.

8. The computer-implemented system of claim 1, wherein the processor is further configured to receive the applications from a scheduler.

9. The computer-implemented system of claim 1, further comprising at least one additional CPU or at least one additional accelerated processing unit.

10. A computer-implemented method, comprising:
receiving, by a processor, a plurality of applications, wherein each of the applications is to be executed by a central processing unit (CPU) or an accelerated processing unit;
generating, by the processor, a computational profile for each of the applications based at least in part upon execution metrics of each of the applications for the CPU and the accelerated processing unit; and
applying, by the processor, a genetic algorithm (GA) prediction model to predict if an execution speedup is achievable on an accelerated processing unit for each of the applications based at least in part upon:
the computational profile for each of the applications;
the computational profile for each of the benchmarks; and
available computational capacities of the CPU and the accelerated processing unit within an execution time window:
wherein the accelerated processing unit is configured to process an accelerated code version of a first one of the applications in response to a prediction, by the processor, that:
the accelerated processor unit has a sufficient available computational capacity to execute the accelerated code version of the first application within the execution time window; and
a predicted accelerated processing unit execution speed is faster than an observed or predicted CPU execution speed within the execution time window; and
wherein the CPU is configured to process a CPU version of a second one of the applications in response to a determination, by the processor, that:
the accelerated processor unit has an insufficient available computational capacity to execute an accelerated code version of the second application within the execution time window; or
the predicted accelerated processing unit execution speed is not faster than the observed or predicted CPU execution speed within the execution time window.

11. The computer-implemented method of claim 10, wherein the accelerated processing unit comprises a processing unit selected from the group consisting of a graphic processing unit (GPU) and a field programmable gate array (FPGA).

12. The computer-implemented method of claim 11, wherein the accelerated code version of the first application comprises an application selected from the group consisting of a GPU code version of the first application and an FPGA code version of the first application.

13. The computer-implemented method of claim 10, further comprising:

arbitrating, by the processor, priorities of executing the first and second applications.

14. The computer-implemented method of claim 13, wherein the priorities of executing the first and second applications are arbitrated based at least in part upon:

predicted increases in computational speeds of the first and second applications at an execution time within the execution time window based at least in part upon available computational capacities of the CPU and the accelerated processing unit at the execution time; or costs of computations of the first and second applications by the CPU and the accelerated processing unit at the execution time.

15. The computer-implemented method of claim 10, further comprising:

applying, by the processor, the GA prediction model to predict a hybrid execution speed of hybrid processing by the CPU and the accelerated processing unit for each of the applications.

16. The computer-implemented method of claim 15, further comprising:

generating, by the processor, an optimization path for processing by the CPU, processing by the accelerated processing unit, or hybrid processing by the CPU and the accelerated processing unit.

17. The computer-implemented method of claim 10, further comprising:

receiving, by the process, the applications from a scheduler.

18. The computer-implemented method of claim 10, wherein at least one of the applications is processed by at least one additional CPU or at least one additional accelerated processing unit.

* * * * *